US010627061B2

(12) United States Patent
Hsiao

(10) Patent No.: US 10,627,061 B2
(45) Date of Patent: Apr. 21, 2020

(54) ILLUMINATION SILL PLATE CAPABLE OF REPLACING AT LEAST ONE POWER CELL

(71) Applicant: HON YU AUTO PARTS CO., LTD., New Taipei (TW)

(72) Inventor: Yin-Teng Hsiao, New Taipei (TW)

(73) Assignee: HON YU AUTO PARTS CO., LTD., New Taipei (TW)

( * ) Notice: Subject to any disclaimer, the term of this patent is extended or adjusted under 35 U.S.C. 154(b) by 0 days.

(21) Appl. No.: 16/527,052

(22) Filed: Jul. 31, 2019

(65) Prior Publication Data

US 2020/0041081 A1    Feb. 6, 2020

(30) Foreign Application Priority Data

Aug. 1, 2018   (TW) .............................. 107126660 A

(51) Int. Cl.
| | | |
|---|---|---|
| B60Q 1/00 | (2006.01) | |
| B60Q 1/26 | (2006.01) | |
| F21S 9/02 | (2006.01) | |
| F21V 8/00 | (2006.01) | |
| B60Q 3/217 | (2017.01) | |
| B60Q 3/50 | (2017.01) | |
| F21V 31/00 | (2006.01) | |
| F21Y 115/10 | (2016.01) | |

(52) U.S. Cl.
CPC ................ *F21S 9/02* (2013.01); *B60Q 3/217* (2017.02); *B60Q 3/50* (2017.02); *F21V 31/00* (2013.01); *G02B 6/0011* (2013.01); *F21Y 2115/10* (2016.08)

(58) Field of Classification Search
CPC ... B60Q 3/217; B60Q 3/50; F21S 9/02; F21V 31/00; G02B 6/0011
USPC ........ 362/488, 495, 501, 511, 543–545, 555, 362/612–613
See application file for complete search history.

(56) References Cited

U.S. PATENT DOCUMENTS

2015/0233560 A1*   8/2015   Cheng .................... B60Q 1/323
362/612

* cited by examiner

*Primary Examiner* — Jason M Han
(74) *Attorney, Agent, or Firm* — Bruce Stone LLP; Joseph A. Bruce

(57) ABSTRACT

An illumination sill plate capable of replacing at least one power cell contains: a base, a light emitting module, the at least one power cell, a transparent cap, a cover plate, and at least one anti-leakage element. The base includes a waterproof barrier and a receiving groove. The light emitting module is fixed in the receiving groove. The at least one power cell is accommodated in the receiving groove so as to supply power to the light emitting module. The transparent cap is configured to cover an opening of the waterproof barrier and has at least one orifice. The cover plate is removably covered on the base and is removed from the base, and the cover plate includes a display window. The at least one anti-leakage element is mounted below the cover plate and is matingly accommodated in the two orifices respectively, when the cover plate is removably covered on the base.

10 Claims, 4 Drawing Sheets

ILLUMINATION SILL PLATE CAPABLE OF REPLACING AT LEAST ONE POWER CELL

FIELD OF THE INVENTION

The present invention relates to an illumination sill plate having at least one power cell configured to supply power to multiple LEDs.

BACKGROUND OF THE INVENTION

A conventional illumination sill plate is mounted on a threshold of a vehicle and is configured to display a trademark or car name.

An improved illumination sill plate contains at least one power cell configured to supply power to a light emitting element so as to eliminate the need to affix a wire to the power supply unit of the vehicle.

The improved illumination sill plate also contains the at least one power cell and a circuit board, and reduces the possibility of damage due to water penetrating into the illumination sill plate.

In addition, the improved illumination sill plate makes replacement of a power cell easier.

The present invention has arisen to mitigate and/or obviate the afore-described disadvantages.

SUMMARY OF THE INVENTION

The primary aspect of the present invention is to provide an illumination sill plate which is capable of avoiding water penetration into the illumination sill plate.

Another aspect of the present invention is to provide an illumination sill plate which is capable of replacing at least one power cell easily.

To obtain the above-mentioned aspects, an illumination sill plate provided by the present invention contains: a base, a light emitting module, the at least one power cell, a transparent cap, a cover plate, and at least one anti-leakage element.

The base includes a waterproof barrier and a receiving groove formed beside the waterproof barrier.

The light emitting module is fixed in the receiving groove of the waterproof barrier.

The at least one power cell is accommodated in the receiving groove of the waterproof barrier so as to supply power to the light emitting module.

The transparent cap is configured to cover an opening of a top of the waterproof barrier and has at least one orifice;

The cover plate is removably covered on the base and is removed from the base so as to replace the at least one power cell, and the cover plate includes a display window.

The at least one anti-leakage element is mounted below the cover plate and is matingly accommodated in two orifices respectively, when the cover plate is affixed to the base.

Preferably, the light emitting module includes a circuit board, multiple light-emitting diodes (LEDs) arranged adjacent to two sides of the circuit board, and a light guide sheet disposed on the circuit board.

Preferably, the transparent cap has a light transmission area formed on a center thereof and has the two orifices arranged beside two sides of the transparent cap respectively.

Preferably, the transparent cap has a first connection face, the waterproof barrier has a second connection face, and a watertight element is defined between the first connection face and the second connection face.

Preferably, the watertight element is a rubber layer or a rubber ring.

Preferably, each of the at least one anti-leakage element is made of foam.

Preferably, the cover plate is made of metal, and the base includes multiple magnets configured to magnetically attract the cover plate.

Preferably, the base has multiple recesses for accommodating multiple magnets respectively.

Preferably, the base or the cover plate has at least one notch defined on a peripheral side of the base or the cover plate.

DETAILED DESCRIPTION OF THE PREFERRED EMBODIMENTS

Figure 1:
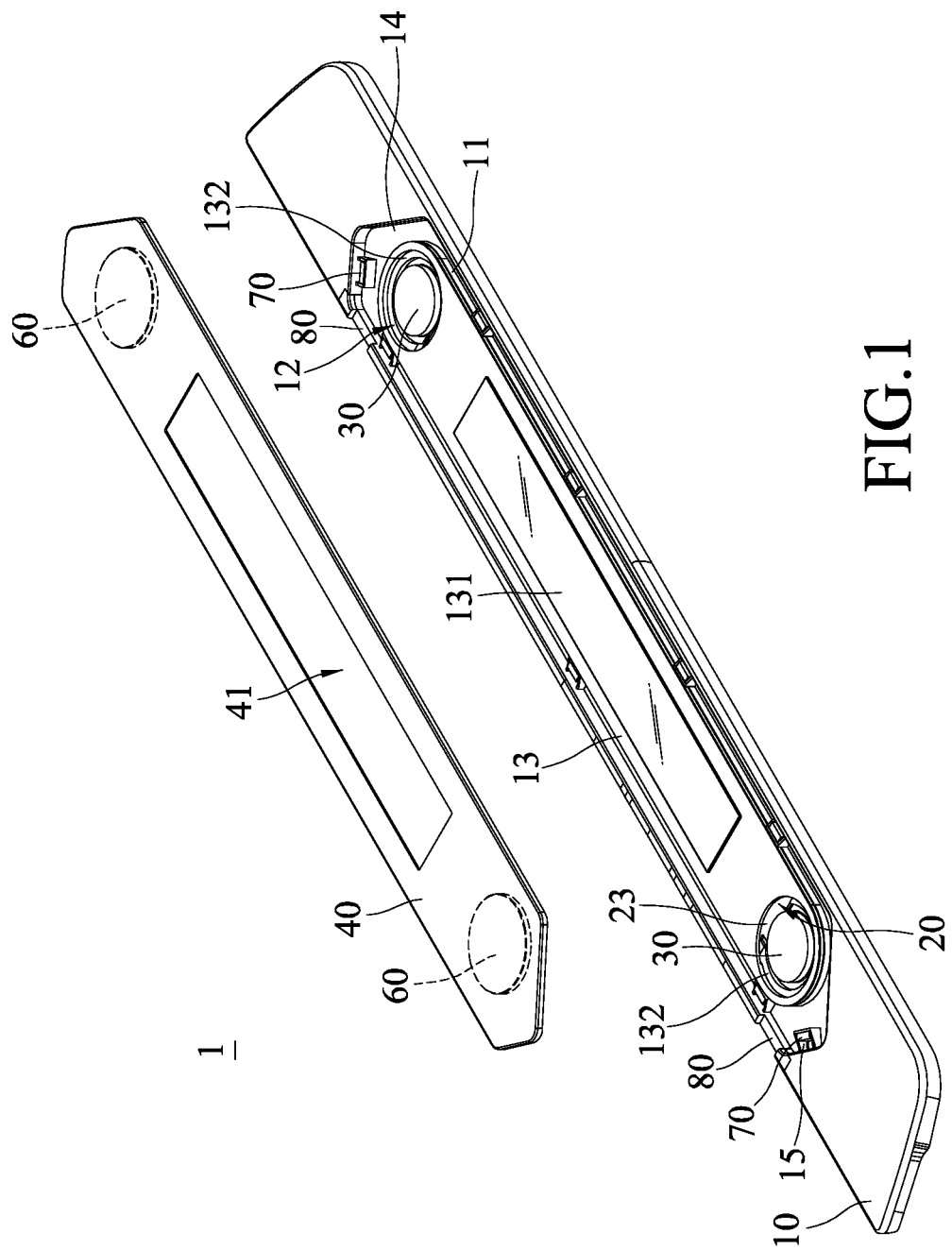
FIG. 1 is a perspective view showing the exploded components of an illumination sill plate according to a preferred embodiment of the present invention.
Figure 2:
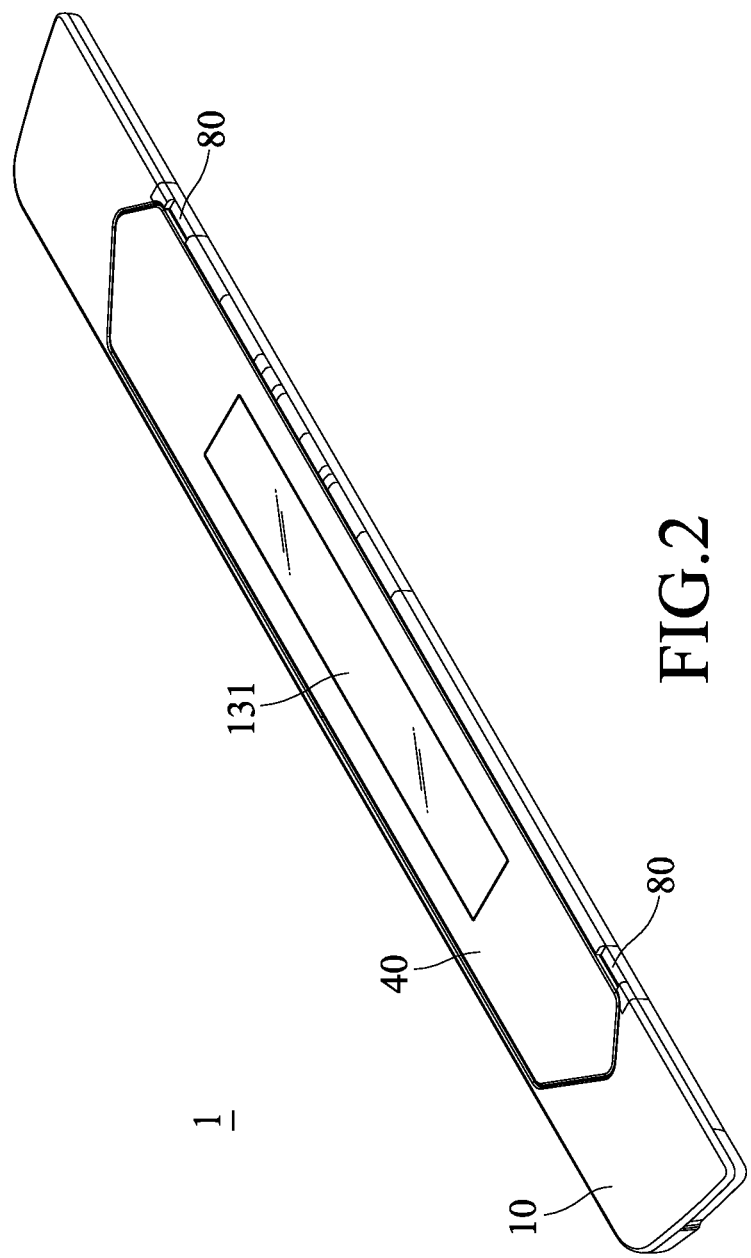
FIG. 2 is a perspective view showing the assembly of the illumination sill plate according to the preferred embodiment of the present invention.
Figure 3:
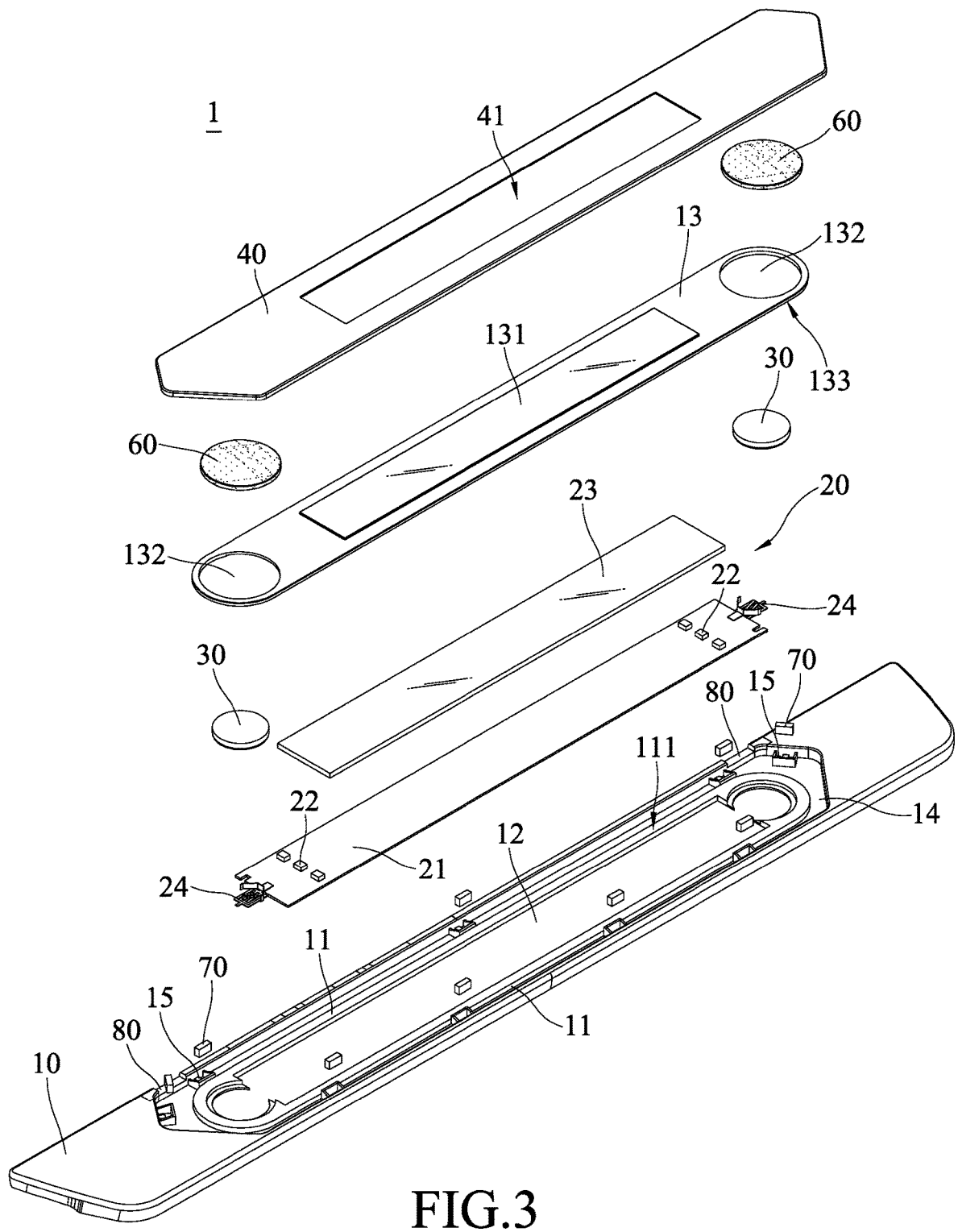
FIG. 3 is another perspective view showing the exploded components of the illumination sill plate according to the preferred embodiment of the present invention.
Figure 4:
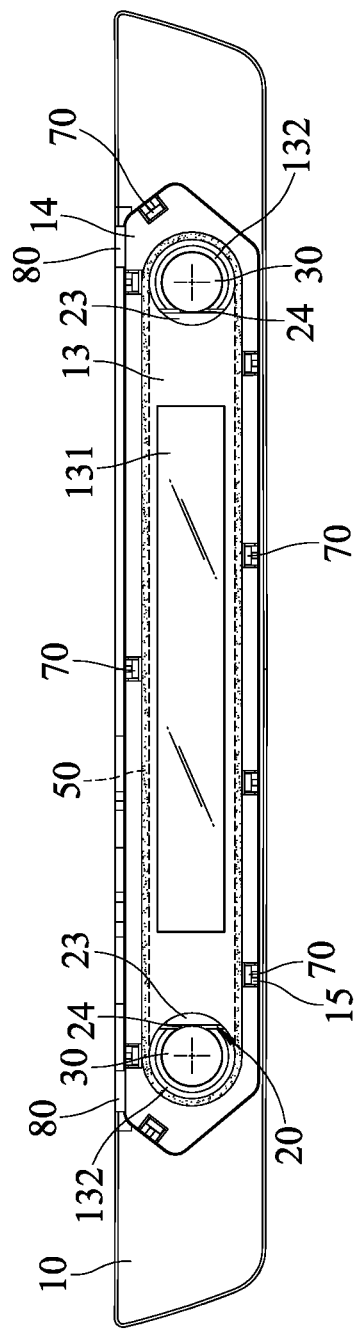
FIG. 4 is a side plan view showing the operation of the illumination sill plate according to the preferred embodiment of the present invention.

With reference to FIGS. 1-4, an illumination sill plate 1 capable of replacing at least one power cell according to a preferred embodiment of the present invention is mounted on a vehicle and comprises: a base 10, a light emitting module 20 and at least one power cell 30 which are accommodated in the base 10, and a cover plate 40 connected on the base 10.

The base 10 includes a waterproof barrier 11 configured to matingly close the light emitting module 20 and the at least one power cell 30 in a receiving groove 12 of the waterproof barrier 11, and the waterproof barrier 11 has a transparent cap 13 configured to cover an opening of a top of the waterproof barrier 11, thus avoiding water flowing into the receiving groove 12.

The transparent cap 13 has a light transmission area 131 formed on a center thereof and has two orifices 132 arranged beside two sides of the transparent cap 13 respectively. The transparent cap 13 is adhered with the waterproof barrier 11, the transparent cap 13 has a first connection face 133, and the waterproof barrier 11 has a second connection face 111, wherein a watertight element 50 is defined between the first connection face 133 and the second connection face 111, and the watertight element 50 is a rubber layer or a rubber ring.

The light emitting module 20 includes a circuit board 21, multiple light-emitting diodes (LEDs) 22 arranged adjacent to two sides of the circuit board 21, a light guide sheet 23 disposed on the circuit board 21, and two conductive sheets 24 fixed on the two sides of the circuit board 21 respectively.

The at least one power cell 30 is accommodated in the receiving groove 12 and is located beside two sides of the light emitting module 20, wherein the at least one power cell 30 is electrically connected with the two conductive sheets 24 on the two sides of the circuit board 21 respectively so as to supply power to the multiple LEDs.

The two orifices 132 are arranged beside the two sides of the transparent cap 13 respectively so as to correspond to two power cells 30, such that the cover plate 40 is opened to remove the two power cells 30 from the two orifices 132 individually, thus replacing the two power cells 30 easily and quickly. To avoid water penetrating into the receiving groove 12, two anti-leakage elements 60 are mounted below the cover plate 40 and are matingly accommodated in the two orifices 132 respectively. Each of the two anti-leakage elements 60 is made of foam and is more than a size of each of the two power cells 30, such that water does not penetrate into the receiving groove 12 via the two orifices 132, thus protecting the light emitting module 20 and the two power cells 30.

The cover plate 40 is made of metal and corresponds to a shape of the opening 14 of the base 10 so as to be covered on the base 10 matingly. The cover plate 40 is removably covered on the base 10 and includes a display window 41 configured to display images of the light emitting module 20.

The opening 14 of the base 10 has multiple recesses 15 for accommodating multiple magnets 70 respectively, such that when the cover plate 40 covers the opening 14 of the base 10, the multiple magnets 70 magnetically attract the cover plate 40, thus cover the cover plate 40 on the base 10 quickly.

After opening the cover plate 40, the two power cells 30 are removed from the two orifices 132 respectively by ways of the multiple magnets 70, thus replacing the two power cells 30 easily. Preferably, the base 10 or the cover plate 40 has at least one notch 80 defined on a peripheral side of the base 10 or the cover plate 40, thus opening the cover plate 40 without using a tool.

Accordingly, the illumination sill plate 1 is capable of avoiding water penetration into the receiving groove 12 to damage the light emitting module 20 and the two power cells 30. The cover plate 40 is opened easily by ways of the two orifices 132 of the transparent cap 13 so as to replace the two power cells 30. Preferably, the two anti-leakage elements 60 are mounted below the cover plate 40 and are matingly accommodated in the two orifices 132 respectively, thus enhancing waterproof effect.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An illumination sill plate capable of replacing at least one power cell comprising:
   a base including a waterproof barrier and a receiving groove formed beside the waterproof barrier;
   a light emitting module fixed in the receiving groove of the waterproof barrier;
   the power cell accommodated in the receiving groove of the waterproof barrier so as to supply power to the light emitting module;
   a transparent cap configured to cover an opening of a top of the waterproof barrier and having at least one orifice;
   a removable cover plate having a display window connected to the base so as to allow access to replace the power cell; and
   at least one anti-leakage element mounted below the cover plate and accommodated to an orifice.

2. The illumination sill plate as claimed in claim 1, wherein the light emitting module includes a circuit board, multiple light-emitting diodes (LEDs) arranged adjacent to the two sides of said circuit board, and a light guide sheet disposed on said circuit board.

3. The illumination sill plate as claimed in claim 1, wherein the transparent cap has a light transmission area formed on a center thereof and has the two orifices arranged at the two sides of the transparent cap respectively.

4. The illumination sill plate as claimed in claim 1, wherein the transparent cap has a first connection face, and the waterproof barrier has a second connection face, wherein a watertight element is defined between the first connection face and the second connection face.

5. The illumination sill plate as claimed in claim 4, wherein the watertight element is a rubber layer or a rubber ring.

6. The illumination sill plate as claimed in claim 1, wherein the anti-leakage element is made of foam.

7. The illumination sill plate as claimed in claim 1, wherein the cover plate is made of metal, and the base includes multiple magnets configured to magnetically attract the cover plate.

8. The illumination sill plate as claimed in claim 7, wherein the base has multiple recesses for accommodating multiple magnets respectively.

9. The illumination sill plate as claimed in claim 1, wherein the base or the cover plate has at least one notch defined on a peripheral side of the base or the cover plate.

10. The illumination sill plate as claimed in claim 7, wherein the base or the cover plate has at least one notch defined on a peripheral side of the base or the cover plate.

* * * * *